United States Patent
Patzner

(10) Patent No.: US 8,001,863 B2
(45) Date of Patent: Aug. 23, 2011

(54) BEARING ARRANGEMENT OF THE TRANSMISSION SHAFTS OF A TWIN-CLUTCH TRANSMISSION

(75) Inventor: Jens Patzner, Potsdam (DE)

(73) Assignees: ZF Friedrichshafen AG, Friedrichshafen (DE); Dr. Ing H.C. F. Porshe AG, Stuttgart (DE)

( * ) Notice: Subject to any disclaimer, the term of this patent is extended or adjusted under 35 U.S.C. 154(b) by 539 days.

(21) Appl. No.: 12/096,084

(22) PCT Filed: Nov. 22, 2006

(86) PCT No.: PCT/EP2006/011155
§ 371 (c)(1),
(2), (4) Date: Jun. 4, 2008

(87) PCT Pub. No.: WO2007/065560
PCT Pub. Date: Jun. 14, 2007

(65) Prior Publication Data
US 2008/0271555 A1 Nov. 6, 2008

(30) Foreign Application Priority Data
Dec. 9, 2005 (DE) .......................... 10 2005 058 946

(51) Int. Cl.
*F16H 3/08* (2006.01)
(52) U.S. Cl. ........................... 74/330; 74/329; 74/665 R
(58) Field of Classification Search .................... 74/664, 74/665 R, 329, 330, 331
See application file for complete search history.

(56) References Cited

U.S. PATENT DOCUMENTS

| 6,044,931 A | 4/2000 | Reed, Jr. et al. |
| 6,119,552 A * | 9/2000 | Matsufuji .................... 74/606 R |
| 7,044,013 B2 | 5/2006 | Ahrens |
| 2004/0170348 A1* | 9/2004 | Okugami et al. ............. 384/492 |
| 2005/0103140 A1* | 5/2005 | Gumpoltsberger ............. 74/329 |
| 2005/0204839 A1* | 9/2005 | Soeda .............................. 74/330 |
| 2005/0229732 A1* | 10/2005 | Hara .............................. 74/325 |
| 2006/0169076 A1 | 8/2006 | Gumpoltsberger et al. |

FOREIGN PATENT DOCUMENTS

| DE | 35 46 454 A1 | 2/1987 |
| DE | 41 23 493 A1 | 1/1993 |
| DE | 101 53 014 A1 | 5/2003 |
| DE | 103 43 995 A1 | 5/2005 |
| DE | 10 2005 005 163 A1 | 9/2006 |
| GB | 2 258 020 A | 1/1993 |

* cited by examiner

*Primary Examiner* — Justin Holmes
(74) *Attorney, Agent, or Firm* — Davis & Bujold, P.L.L.C.

(57) ABSTRACT

An arrangement of bearings for transmission shafts of a twin-clutch transmission having a first input shaft connected with a first clutch, a hollow second input shaft co-axially supported on the first input shaft and connected with a second clutch and a main shaft, which is parallel to and connected with the input shafts a drive constant via gear stages comprising fixed and loose gear wheels and a shift clutch. The drive constant is connected with an output shaft, which is parallel to the main shaft. The transmission shafts are supported by bearings, which are arranged in bearing planes, one of which is formed by an inner wall of the transmission housing and is axially adjacent the drive constant. This bearing plane includes one bearing supporting the main shaft, one bearing supporting the second input shaft and one bearing supporting the first input shaft within the second input shaft.

16 Claims, 2 Drawing Sheets

BEARING ARRANGEMENT OF THE TRANSMISSION SHAFTS OF A TWIN-CLUTCH TRANSMISSION

This application is a national stage completion of PCT/EP2006/011155 filed Nov. 22, 2006, which claims priority from German Application Serial No. 10 2005 058 946.4 filed Dec. 9, 2005.

FIELD OF THE INVENTION

The invention relates to a bearing arrangement of the transmission shafts of a twin-clutch transmission which has a central first input shaft connected on the ending side with a first clutch of a twin-clutch arrangement; a shorter second input shaft is designed as a hollow shaft, which is co-axially arranged with the first input shaft, and is connected with a second clutch of the twin-clutch arrangement, and a main shaft, which is arranged parallel with the two input shafts and can be selectively connected with the first input shaft and the second input shaft by way of several gear wheel stages each comprising one fixed wheel and one loose wheel and one shift clutch coordinated with the respective loose wheel and selectively connectable with the first input shaft. The second input shaft is connected with an output shaft situated parallel to the main shaft by way of an drive constant formed by two fixed wheels wherein with each of the two input shafts, several gear wheels are coordinated, wherein the loose wheels of adjacent gearwheel stages are, in each case, arranged in pairs on a common transmission shaft and can be alternatively shifted by two shift clutches combined in a shift set and wherein the drive constant is arranged in the area of the transmission internal end of the second input shaft, between two pairs of toothed gear wheels.

BACKGROUND OF THE INVENTION

It is generally known that shafts, the same as transmission shafts, are rotatably supported in a housing with one fixed bearing and at least one loose bearing with the bearings mostly arranged on the ends. Both radial forces and axial forces are absorbed and the shaft is axially fixed by the fixed bearing. The loose bearing, on the other hand, absorbs only radial forces and by an axially displaceable design of the bearing proper or of the fixing of the bearing makes it possible to compensate for a change in the length of the shaft concerned which can be caused by loading forces and by heat expansion.

It is also generally known in the bearing arrangement of a long shaft to provide located on the ends, such that excessive bending of the shaft is prevented. But especially in vehicle transmissions is basically designed to equip the bearing arrangement of the transmission shafts with as few as possible bearings and to construct it altogether as simple as possible. Hereby is obtained, on one hand, an easy assembly of the transmission and, on the other, the building space and the weight of the transmission are kept small. But the possibilities of construction for this are essentially determined by the type of construction of the transmission, particularly the number and arrangement of the transmission shafts.

DE 35 46 454 C2 discloses a twin-clutch transmission having a central first input shaft, a shorter second input shaft, designed as a hollow shaft, and situated co-axially with the first input shaft, and a layshaft situated parallel to both input shafts. The layshaft forms the output shaft and, for the purpose, has a bevel pinion on its engine-side end a bevel pinion for driving a bevel gear of an axle differential. The first input shaft is supported in the transmission housing by an outer and an inner tapered rolling bearing in an adjusted bearing arrangement in which each of the two bearings absorbs outwardly directed axial forces. In the same manner, the second input shaft is supported in the transmission housing by an outer and an inner tapered rolling bearing in an adjusted bearing arrangement.

The layshaft is supported in the transmission housing on its engine-side end by a fixed bearing formed of two tapered roller bearings and loose bearings situated centrally and on opposite ends, wherein the central loose bearing and the inner tapered bearing of the second input shaft lie in a common bearing plane and in a separate bearing plate of the transmission housing.

In DE 41 23 493 C2 describes a twin-clutch transmission having a central first input shaft, a shorter second input shaft, designed as a hollow shaft which is co-axially supported on the first input shaft, and a layshaft located parallel to both input shafts and in which the output shaft is formed by one other transmission shaft situated co-axially to both input shafts. The central first input shaft has a transmission-internal hollow shaft section with which it is supported on the output shaft by an inner fixed bearing and an outer loose bearing. The output shaft is supported by a fixed bearing in an output-side wall of the transmission housing.

The second input shaft is designed to be relatively short and supported by a fixed bearing in an input sidewall of the transmission housing. The first input shaft is supported on the input side by an outer and an inner loose bearing in the second input shaft, wherein the inner loose bearing is supported in about the same bearing plane as the fixed bearing of the second input shaft. The ends of the layshaft are supported in the transmission housing on the input side by a fixed bearing and on the output side by a loose bearing.

One other twin-clutch transmission having a central first input shaft and a shorter second input shaft, designed as a hollow shaft and co-axially supported on the first input shaft, is known from DE 101 53 014 A1. This twin-clutch transmission has two layshafts, situated parallel to both input shafts, and together with both input shafts are arranged in a V-shape and are each connected by an output fixed wheel with a common output element. The second input shaft is axially floatingly supported on the first input shaft by two axial bearings situated on the ends. The first input shaft is supported in a wall of the transmission housing via a fixed bearing situated on its engine-remote end and by two loose bearings in the second input shaft. The second input shaft is radially supported by a loose bearing in an engine sidewall of the transmission housing in the bearing plane of which is also situated the outer loose bearing of the first input shaft.

Contrary to the aforementioned transmission, in the Applicant's unpublished DE 10 2005 005 163.4, a twin-clutch transmission is introduced which, together with a central first input shaft which is connected on the engine side with a first clutch of a twin clutch, a shorter input shaft, designed as a hollow shaft, and co-axially situated on the first input shaft, the same as connected with a second clutch of the twin clutch, and a main shaft disposed parallel to both input shafts, in addition, has one pinion shaft disposed parallel to the main shaft and connected with the main shaft by an drive constant formed by two fixed wheels and disposed in the area of the transmission-internal end of the second input shaft between two pairs of toothed gear wheels.

This invention is based on the problem of providing an optimal support of the transmission shafts for the twin-clutch transmission disclosed in DE 10 2005 005 163.4 and for similarly constructed twin-clutch transmissions.

SUMMARY OF THE INVENTION

The invention departs from a bearing arrangement for the transmission shafts of a twin-clutch transmission which has one central first input shaft connected on the engine side with a first clutch of a twin-clutch arrangement, one shorter second input shaft, designed as a hollow shaft, which is situated co-axially on the first input shaft and connected with a second clutch of the twin-clutch arrangement, and one main shaft, located parallel to the two input shafts which, via a plurality of gear wheel stages, each of which comprise a fixed wheel, a loose wheel and one shaft clutch associated with the loose wheel, can be selectively connected with the first input shaft and the second input shaft and via a drive constant, formed by two fixed wheels, is connected with an output shaft disposed parallel to the main shaft. Several toothed gear wheels are coordinated with each of the two input shafts, wherein the loose wheels of adjacent gear wheel stages are arranged in pairs on a common transmission shaft and are alternatively shiftable, via two shift clutches, combined in a shift set and, wherein the drive constant is situated in the area of the transmission-internal end of the second input shaft between two pairs of toothed gear wheels.

To solve the stated problem, in addition, a bearing plane is provided, formed by one inner wall of the transmission housing, disposed axially adjacent to the drive constant. One bearing of the main shaft in the housing wall, one bearing of the first input shaft in the second input shaft and one bearing of the second input shaft in the housing wall.

By virtue of the bearings of the added bearing plane, in a place-saving manner, substantial axial bending both of the main shaft and of the first input shaft is prevented. The first input shaft by the radially supported in inner housing wall by a radially inner bearing, the hollow wall of the second input shaft and the radially outer bearing. Hereby the mechanical load of all transmission shafts of the shaft bearings concerned and of the toothings of the gear wheels are reduced, which results in less wear and less running noises. As a result of these circumstances, the transmission shafts can also be designed with smaller diameters or with reduced wall thickness thus diminishing the weight of the twin-clutch transmission.

The inner housing wall is advantageously formed by one bearing plate which, as a flange plate, is fastened between two parts of the housing or on a flanged collar within one part of the transmission housing. Hereby the parts of the transmission housing can be designed as hollow bodies without inner housing walls and housing bars. Since inner undercuts are thus eliminated, the housing parts can be produced in a relatively quick and inexpensive die cast process with simple molding from die cast molds.

The additional bearing plane is conveniently situated upon the side of the drive constant upon which lie the toothed gear wheels of the lower gears, especially of the second and of the reverse gears, since they transmit the stronger tangential forces at a given input torque, which act as radial forces on the concerned transmission shafts. But it is possible to arrange the bearing plane on the transmission-internal side of the drive constant whereby the main shaft and the first input shaft are radially supported approximately centrally between the outer bearings.

The three bearings, located within the housing walls, are preferably designed as loose bearings, since this extensively simplifies the assembly of the transmission shafts. In this case, it is convenient to support the first input shaft, in addition to the bearing situated in the inner housing wall, by a fixed bearing located in an outer wall of the transmission housing on the engine-remote side outside the outer toothed gear wheels and on the engine side by a loose bearing situated in the clutch cage of the twin-clutch arrangement.

The second input shaft can then be correspondingly supported, in addition to the bearing situated in the inner housing wall, on the engine side by a fixed bearing situated between the clutch cage and the outer toothed gear wheels in a clutch adjacent wall of the transmission housing.

In this case, the main shaft is conveniently supported, in addition to the bearing situated in the inner housing wall, by a fixed bearing situated in the outer wall of the transmission housing on the engine-remote side outside the outer toothed wheels and via a loose bearing situated on the engine-side outside the outer toothed gearwheels in the clutch-adjacent wall of the transmission housing.

Also possible is, however, a design as fixed bearing of the bearing of the first input shaft situated in the inner housing wall, wherein the first input shaft, in addition thereto, is supported via a loose bearing situated on the engine-remote side outside the outer toothed gear wheels in the outer wall of the transmission housing and engine side via a loose bearing in the clutch cage of the twin-clutch arrangement.

The bearing of the second input shaft situated in the inner housing wall can likewise be designed as a fixed bearing and the second input shaft additionally thereto be supported engine-side, via a loose bearing, situated between the clutch cage and the outer toothed gear wheels in the wall near the clutch of the transmission housing.

The bearing of the main shaft situated in the inner housing wall can further be designed as a fixed bearing and the main shaft in addition thereto be supported via a loose bearing situated in the outer wall of the transmission housing on the engine-remote side outside the outer toothed gear wheels and by a loose bearing situated engine-side outside the outer toothed gear wheels in the clutch-adjacent wall of the transmission housing.

In an extreme case, all three bearings situated in the inner housing wall can thus be designed as loose bearings which, when the inner transmission wall is designed as a bearing plate, simplifies a pre-assembly therein of the transmission shafts.

The clutch cage of the twin-clutch arrangement is advantageously supported by an engine-side fixed bearing and a transmission-side loose bearing in the housing walls of a clutch housing.

As a result of their sturdiness and space-saving construction, the loose bearings are preferably designed as cylindrical roller bearings or as needle bearings and the fixed bearings as grooved ball bearings.

BRIEF DESCRIPTION OF THE DRAWINGS

The invention will now be described, by way of example, with reference to the accompanying drawings in which.

DETAILED DESCRIPTION OF THE INVENTION

Figure 1:
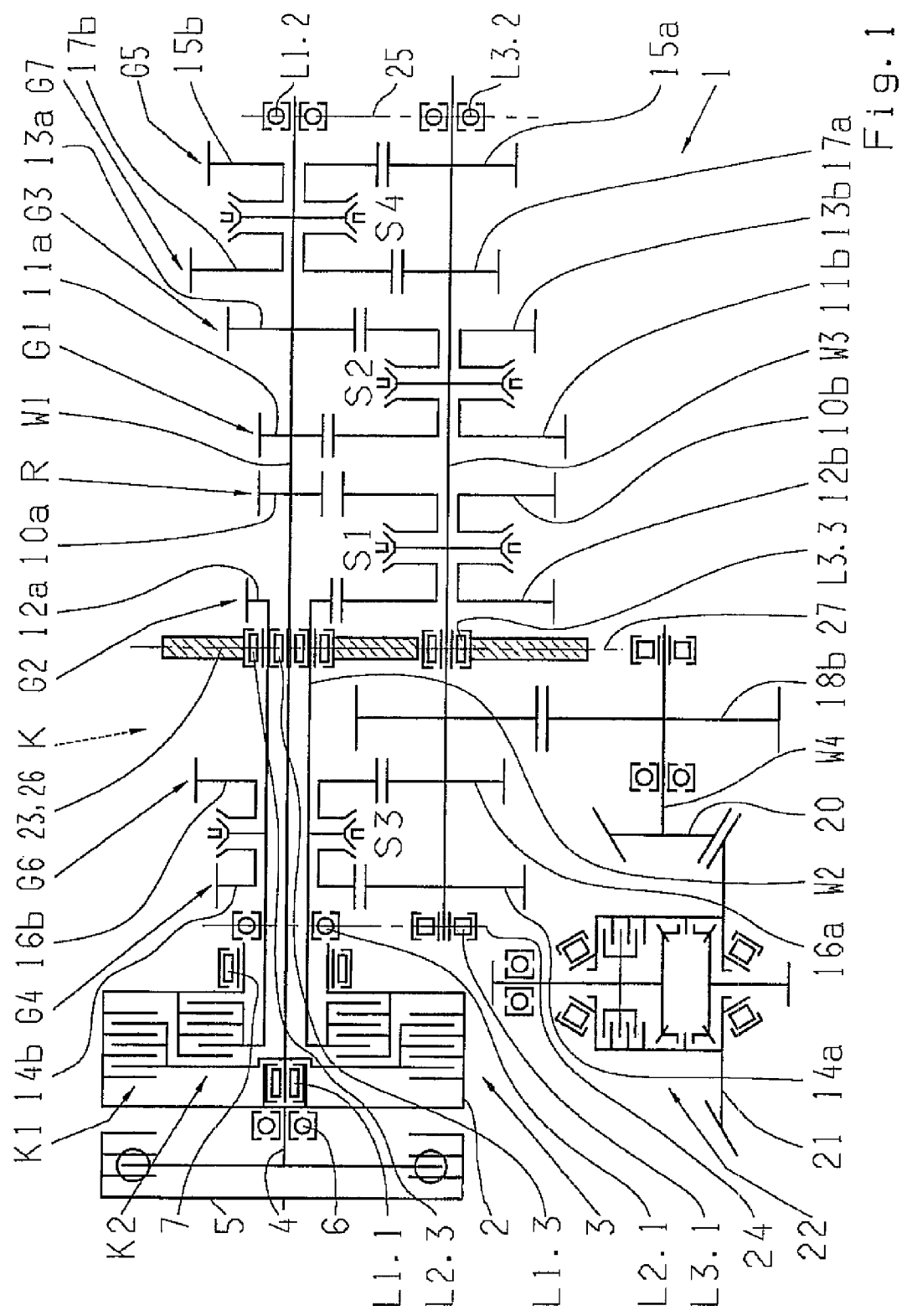
FIG. 1 is a twin-clutch transmission with a first preferred design of the bearing arrangement of the transmission shafts.

In a twin-clutch transmission 1, according to FIG. 1, a clutch cage 2 of a twin-clutch arrangement 3 is connected with the crankshaft of an internal combustion engine (not shown), via an input shaft 4 and a torsional vibration damper 5. A first clutch K1 of the twin-clutch arrangement 3 is connected with a central first input shaft W1. A second clutch K2 of the twin-clutch arrangement 3 is connected with a second shorted input shaft W2, designed as a hollow shaft, and coaxially situated on the first input shaft W1. A main shaft W3 is disposed parallel to the two input shafts W1, W2 and by toothed gear wheels, comprising one fixed gear wheel and one loose gear wheel, which form the gear wheel stages, and with the shift clutches coordinated with the loose gear wheels, can be selectively connected with the input shafts W1, W2.

Toothed gear wheels 10a, 10b of a reverse gear R, toothed gear wheels 11a, 11b of a first gear G1, toothed gear wheels 13a, 13b of a third gear G3, the toothed gear wheels 17a, 17b of a seventh gear G7' and toothed gear wheels 15a, 15b of a fifth gear G5 are coordinated with the first input shaft W1. Toothed gear wheels 14a, 14b of a fourth gear G4, toothed gear wheels 16a, 16b of a sixth gear G6 and toothed gear wheels 12a, 12b of a second gear G2 are coordinated with the second input shaft W2.

The loose gear wheels 10b and 12b of the reverse gear R and of the second gear G2 are situated on the main shaft W3 and can be alternatively shifted via a shift sleeve and two shift clutches combined in a first shift set S1. The loose bear wheels 11b and 13b of the first gear G1 and of the third gear G3 are likewise situated on the main shaft W3 and are alternatively shiftable via a corresponding second shift set S2. The loose gear wheels 14b and 16b of the fourth gear G4 and of the sixth gear G6 are situated on the second input shaft W2 and are alternatively shiftable via a third shift set S3. The loose gear wheels 15b and 17b of the fifth gear G5 and of the seventh gear G7 are situated on the first input shaft W1 and are alternatively shiftable via a fourth gearset S4.

The main shaft W3 is connected with an output shaft W4 via a drive constant K formed by two fixed gear wheels 18a and 18b, wherein the fixed gear wheel 18a is coordinated with the main shaft W3 and situated between the fixed gear wheel 16a of the sixth gear G6 and the loose gear wheel 12b of the second gear G2. The output shaft W4 has a bevel gear wheel 20 which is engaged with a ring gear 21 of an axle differential 22.

The first input shaft W1 is supported by a fixed bearing L1.2 situated in an outer wall of the transmission housing on the engine-remote side outside the axially outer toothed wheels 15a, 15b, on the engine-side by a loose bearing L1.1 situated in the clutch cage 2 of the twin-clutch arrangement 3 and therebetween by one other loose bearing L1.3 in the second input shaft W2.

The second input shaft W2 is supported on the engine-side by a fixed bearing L2.1 situated in a clutch-adjacent wall of the transmission housing between the clutch cage 2 and the outer toothed gear wheels 14a, 14b and on its transmission-inner end by a loose bearing L2.3 in an inner wall 23 of the transmission housing.

The main shaft W3 is supported by a fixed bearing L3.2 situated in the outer wall of the transmission housing on the engine-remote side axially outside the outer toothed gear wheels 15a, 15b by a loose bearing L3.1 situated in the clutch-adjacent wall of the transmission housing on the engine-side axially outside the outer toothed gear wheels 14a, 14b and therebetween by one other loose bearing L3.3 in the inner wall 23 of the transmission housing.

The engine-side bearings L2.1 and L3.1 of the second input shaft W2 and of the main shaft W3 are placed in a first bearing plane 24. The bearings L1.2, L3.2 of the first input shaft W1 and of the main shaft W3 are located in a second bearing plane 25. The inner housing wall 23 is situated between the toothed gear wheels 18a and 18b of the drive constant K and the toothed gear wheels 12a and 12b of the second gear G2, and is also designed like a bearing plate 26 which, by fastening means such as screws, can be assembled in the transmission housing. The bearing plate 26 forms a third bearing plane 27 for the bearings L1.3, L2.3 and L3.3 of the first input shaft W1 and of the second input shaft W2, the same as of the main shaft W3.

By virtue of the formation and arrangement of the inner transmission wall 23 there is created in a space-saving manner an extensive middle bearing of the first input shaft W1 and of the main shaft W3 by which an excessive bending of the shafts is prevented thus eliminating consequent misalignments on the toothings of the gear wheels and even in the bearing arrangement of the shafts W1, W3, the same as wear phenomena resulting therefrom.

Figure 2:
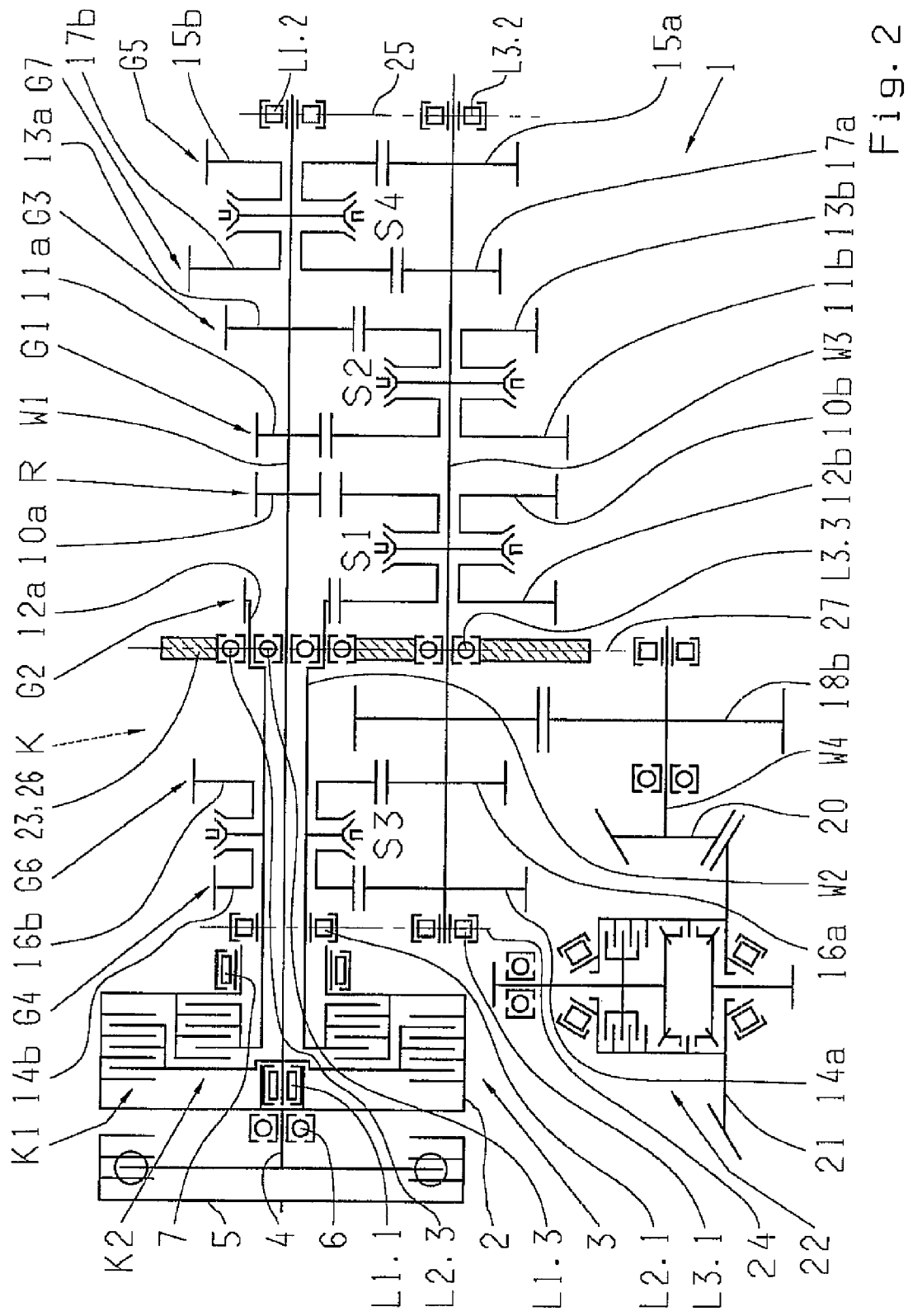
FIG. 2 is a twin-clutch transmission with a second preferred design of the bearing arrangement of the transmission shafts.

Contrary to FIG. 1, where all bearings L1.3, L2.3, L3.3 of the third bearing plane 27 are designed as loose bearings, these bearings are designed in the twin-clutch transmission, according to FIG. 2, as fixed bearings so that the shafts concerned W1, W2 and W3 in the bearing plane 26 can be assembled, the same as inserted together with them, in the transmission housing. In this case, the other bearings, particularly the engine-remote bearing L1.2 of the first input shaft W1, the engine-side bearing L2.1 of the second input shaft W2 and the engine-remote bearing L3.2 of the main shaft W3 can be designed as loose bearings.

In both embodiments of the invention, the clutch cage 2 of the twin-clutch arrangement 3 is rotatably supported in the walls of a clutch housing, via an engine-side fixed bearing 6 and a transmission-side loose bearing 7.

Without a fixing in these preferred constructions, in FIG. 1 and FIG. 2, the loose bearings are each shown symbolically as cylindrical roller bearings or as needle bearings and the fixed bearings each as grooved ball bearings.

REFERENCE NUMERALS 1 twin-clutch transmission
2 clutch cage
3 twin-clutch arrangement
4 input shaft
4 torsional vibration damper
6 fixed bearing
7 loose bearing
10a fixed gear wheel (of R)
10b loose gear wheel (of R)
11a fixed gearwheel (of G1)
11b loose gear wheel (of G1)
12a fixed gear wheel (of G2)
12b loose gear wheel (of G2)
13a fixed gearwheel (of G3)
13b loose gear wheel (of G3)
14a fixed gearwheel (of G4)
14b loose gear wheel (of G4)
15a fixed gear wheel (of G52)
15b loose gear wheel (of G5)
16a fixed gearwheel (of G6)
16b loose gear wheel (of G6)
17a fixed gear wheel (of G7)
17b loose gear wheel (of G7)
18a fixed gear wheel (of K)
18b fixed gear wheel (of K)
20 bevel gear wheel
21 ring gear
22 axle differential
23 inner housing wall
24 first bearing plane 25 second bearing plane
26 bearing plate
27 third bearing plane
G1 first gear
G2 second gear
G3 third gear
G4 fourth gear
G5 fifth gear
G6 sixth gear
G7 seventh gear
K drive constant
K1 first clutch (of 3)
K2 second clutch (of 3)
L1.1 (first) bearing of (W1)
L1.2 (second) bearing (of W1)
L1.3 (third) bearing (of W1)
L2.1 (first) bearing (of W2)
L2.3 (second) bearing (of W2)
L3.1 (first) bearing (of W3)
L3.2 (second) bearing (of W3)
L3.3 (third) bearing (of W3)
R reverse gear
S1 first shift set
S2 second shift set
S3 third shift set
S4 fourth shift set
W1 first input shaft
W2 second input shaft
W3 main shaft
W4 output shaft
W4 output shaft

The invention claimed is:

1. A bearing arrangement of transmission shafts of a twin-clutch transmission (1) which has a central first input shaft (W1) connected at an engine side with a first clutch (K1) of a twin-clutch arrangement, a shorter second input shaft (W2), designed as a hollow shaft, being co-axially disposed on the first input shaft (W1) and being connected with a second clutch (K2) of the twin-clutch arrangement and a main shaft (W3) arranged parallel to the first and the second input shafts (W1, W2) and being connectable, via a plurality of gear wheel stages, each comprising a fixed gear wheel and a loose gear wheel and, by way of a shift clutch, coordinated with a respective loose wheel being selectively connectable with the first input shaft (W1) and the second input shaft (W2) and one drive constant (K) and being connected with an output shaft (W4) disposed parallel to the main shaft (W3), each of the first and the second input shafts (W1, W2) having several toothed gear wheels, loose gear wheels of adjacent gear wheel stages are each located by pairs on a common transmission shaft and being alternatively shiftable by two shift clutches, combined in one shift set, and the drive constant (K) being disposed in an area of a transmission-inner end of the second input shaft (W2) between two pairs of toothed gear wheels, a bearing plane (27) formed by an inner housing wall (23) of a transmission housing being provided and being axially adjacent to the drive constant (K), aligned along the bearing plane (27) in the inner housing wall (23) are a bearing (L3.3) of the main shaft (W3), a bearing (L2.3) of the second input shaft (W2), and a bearing (L1.3) of the first input shaft (W1) being arranged within the second input shaft (W2) and along the bearing plane (27).

2. The bearing arrangement according to claim 1, wherein the inner housing wall (23) is one of formed by a bearing plate (26) designed as a flange plate between two housing parts and fastened on a flange collar within a part of the transmission housing.

3. The bearing arrangement according to claim 1, wherein the bearing plane (27) is situated on a side of the drive constant (K) upon which lie a toothed gear wheels (12a, 12b, 10a, 10b) of lower gears (G2, R).

4. The bearing arrangement according to claim 1, wherein the bearing plane (27) is situated on a transmission-inner side of the drive constant (K).

5. The bearing arrangement according to claim 1, wherein the bearing (L1.3) of the first input shaft (W1) situated in the inner housing wall (23) is a fixed bearing and the first input shaft (W1) in addition thereto is supported by a loose bearing (L1.2) situated in an outer wall of the transmission housing on an engine-remote side outside axially outer toothed gear wheels (15a, 15b) and on an engine side by a loose bearing (L1.1) situated on the engine side in a clutch cage (2) of the twin-clutch arrangement (3).

6. The bearing arrangement according to claim 1, wherein the bearing (L2.3) of the second input shaft (W2) situated in an inner housing wall (23) is a fixed bearing and the second input shaft (W2), in addition thereto, is supported on an engine side by a loose bearing (L2.1) situated in a clutch-adjacent wall of the transmission housing between a clutch cage (2) and axially outer toothed gear wheels (14a, 14b).

7. The bearing arrangement according to claim 1, wherein the bearing (L3.3) of the main shaft (W3) situated in the inner housing wall (23) is a fixed bearing and the main shaft (W3), in addition thereto, is supported by a loose bearing (L3.2) situated on an engine-remote side outside axially outer toothed gear wheels (15a, 15b) in an outer wall of the transmission housing and by a loose bearing (L3.1) situated on an engine-side outside other axially outer toothed gear wheels (14a, 14b) in a clutch-adjacent wall of the transmission housing.

8. The bearing arrangement according to claim 1, wherein a clutch cage (2) of the twin-clutch arrangement (3) is supported by an engine-side fixed bearing (6) and a transmission-side loose bearing (7) in walls of a clutch housing.

9. The bearing arrangement according to claim 1, wherein three bearings (L1.3, L2.3, L3.3) are aligned along the bearing plane (27) on the inner housing wall (23) and the three bearings (L1.3, L2.3, L3.3) are loose bearings.

10. The bearing arrangement according to claim 9 wherein the first input shaft (W1) is supported, in addition to the bearing (L1.3) situated in the inner housing wall (23), by a fixed bearing (L1.2) situated in an outer wall of the transmission housing on an engine-remote side axially outside outer toothed gear wheels (15a, 15b) and on an engine-side by a loose bearing (L1.1) situated in a clutch cage (2) of the twin-clutch arrangement (3).

11. The bearing arrangement according to claim 9, wherein the second input shaft (W2) is supported, in addition to the bearing (L2.3) situated in the inner housing wall (23), by a fixed bearing (L2.1) situated in a clutch-adjacent wall of the transmission housing on an engine side between a clutch cage (2) and axially outer toothed gear wheels (14a, 14b).

12. The bearing arrangement according to claim 9, wherein the main shaft (W3) is supported, in addition to the bearing (L3.3) situated in the inner housing wall (23), by a fixed bearing (L3.2) situated in an outer wall of the transmission housing on an engine-remote side outside axially outer toothed gear wheels (15a, 15b) and by a loose bearing (L3.1) situated in a clutch-adjacent wall of the transmission housing engine-side outside axially other outer toothed gear wheels (14a, 14b).

13. The bearing arrangement according to claim 9, wherein at least one of the loose bearings is a cylindrical roller bearing.

14. The bearing arrangement according to claim 9, wherein at least one of the loose bearings is a needle bearing.

15. The bearing arrangement according to claim 9, wherein at least one of the bearings is a grooved ball bearing.

16. A bearing arrangement for a twin-clutch transmission (1) comprising:

a central first input shaft (W1) having first and second ends, the first end of the central first input shaft (W1) is coupled to a first clutch (K1) of a twin-clutch arrangement (3), which is located on an engine side of the transmission (1);

a hollow second input shaft (W2) having first and second ends, the first end of the second input shaft (W2) is coupled to a second clutch (K2) of the twin-clutch arrangement (3), the first input shaft (W1) and the second input shaft (W2) are coaxial and the first input shaft (W1) extends axially from the engine side of the transmission (1) through the hollow second input shaft (W2) beyond the second end of the second input shaft (W2) to an opposed engine remote side of the transmission (1);

a main shaft (W3) extends parallel to the first input shaft (W1) and the second input shaft (W2);

a plurality of gear wheel stages are supported by the first input shaft (W1), the second input shaft (W2) and the main shaft (W3), each of the plurality of gear wheel stages comprise a fixed gear wheel, a loose gear wheel and a shift sleeve, the first input shaft (W1) and the second input shaft (W2) connect to the main shaft (W3) by selective engagement of one of the plurality of gear wheel stages, the main shaft (W3) engages, via a drive constant (K), an output shaft (W4), which is parallel to the main shaft (W3); and a first bearing (L1.3) rotatably supports the first input shaft (W1) and is located within the hollow second input shaft (W2), a second bearing (L2.3) rotatably supports the second end of the second input shaft (W2) and is supported by an inner wall (23) of a transmission housing, a third bearing (L3.3) rotatably supports the main shaft (W3) and is supported by the inner wall (23) of the transmission housing, the first bearing (L1.3), the second bearing (L2.3), the third bearing (L3.3) and the inner wall (23) of the transmission housing are aligned in and define a bearing plane (27), and the drive constant (K) is axially located directly adjacent the bearing plane (27) and on an engine side of the bearing plane (27).

\* \* \* \* \*